United States Patent [19]

Lodge

[11] Patent Number: 4,858,005
[45] Date of Patent: Aug. 15, 1989

[54] SYSTEM FOR ENCODING BROADCAST QUALITY TELEVISION SIGNALS TO ENABLE TRANSMISSION AS AN EMBEDDED CODE

[75] Inventor: Nicolas K. Lodge, Hampshire, United Kingdom

[73] Assignee: Independent Broadcasting Authority, London, England

[21] Appl. No.: 113,822

[22] PCT Filed: Feb. 17, 1987

[86] PCT No.: PCT/GB87/00116

§ 371 Date: Oct. 14, 1987

§ 102(e) Date: Oct. 14, 1987

[87] PCT Pub. No.: WO87/05179

PCT Pub. Date: Aug. 27, 1987

[30] Foreign Application Priority Data

Feb. 17, 1987 [GB] United Kingdom ................ 8603880

[51] Int. Cl.⁴ .................... H04N 7/12; H04N 11/06; H04N 7/04
[52] U.S. Cl. ................................... 358/135; 358/133; 358/136; 358/12; 358/141
[58] Field of Search ................ 358/135, 136, 138, 12, 358/141, 133

[56] References Cited

U.S. PATENT DOCUMENTS

| | | | |
|---|---|---|---|
| 4,383,272 | 5/1983 | Netravali et al. | 358/136 |
| 4,609,941 | 9/1986 | Carr et al. | 358/136 |
| 4,665,436 | 5/1987 | Osborne et al. | 358/136 |
| 4,703,350 | 10/1987 | Hinman | 358/138 |

OTHER PUBLICATIONS

Westerkamp, D.; "Adaptive Intra-/Interframe DPCM Coding for Transmission of Colour TV Signals with 34Mbit/s"; Proc. IEEE Int. Zurich Seminar on Digital Comm.; Mar. 1984; pp. 39–45.

Buley, H. and Stenger, L.; "Inter/Intraframe Coding of Colour TV Signals for Transmission at the Third Level of the Digital Hierarchy"; Proc. IEEE, 73, 4; 1985; pp. 765–772.

E. Dubols; "The Sampling and Reconstruction of Time-Varying Imagery with Application in Video Systems"; Proc. IEEE, 73, 4; 1985; pp. 502–522.

Sabatier, J., et al.; "Coding System for 34Mbit/s Digital Transmission of Colour Television"; Commutation & Transmission, 1; 1982; pp. 69–82.

G. Reitmeier and R. Dischert; "A Multiplexed Nyquist Region Approach for High Quality 2:1:1 Digital Video"; Proc. 13th Int. TV Symp., Montreux; 1983; pp. 400–408.

Marr and Hildreth; "Theory of Edge Detection"; Proc. R. Soc. Lond. B; 1980; 207, pp. 187–217.

J. Limb; "Picture Coding: The Use of a Viewer Model in Source Encoding"; BSTJ, 52, 8; 1973; pp. 1271–1302.

Netravali, A.; "Interpolative Picture Coding Using a Subjective Criterion"; IEEE Trans. Comm., 25, 5; 1977; pp. 503–508.

*Primary Examiner*—Howard W. Britton
*Assistant Examiner*—John K. Peng
*Attorney, Agent, or Firm*—Watson, Cole, Grindle & Watson

[57] ABSTRACT

The invention provides a system of encoding broadcast-quality television signals to enable their transmission as a embedded code.

A preferred embodiment provides a hybrid interpolative/predictive coding algorithm acting on all sampled sites of a television signal. One sub-set of samples are adaptively interpolatively coded; a 3-state interpolator switching signal is produced at each site, redundancy is removed and the signal transmitted. The interpolator switching signal also acts as a descriptor at sites surrounded each sample to be predicted. Adaptive prediction is used for the other sub-set of samples the particular predictor used at a sample site being determined by the surrounding descriptors.

29 Claims, 6 Drawing Sheets

SYSTEM FOR ENCODING BROADCAST QUALITY TELEVISION SIGNALS TO ENABLE TRANSMISSION AS AN EMBEDDED CODE

BACKGROUND OF THE INVENTION

1. Field of the Invention

The present invention relates to the field of television signal encoding. In particular, the invention relates to an encoding algorithm, encoder and decoder enabling transmission of broadcast quality television signals in the form of an embedded code.

2. Related Art

In the television studio there is a continuing trend towards the replacement of analogue, composite picture handling by digital manipulation of separate luminance and chrominance components. This is performed at the internationally agreed rate of 166M bit/s, with a further 50M bit/s representing the redundant picture blanking. A full television "package" however must also comprise audio channels, teletext, synchronisation and control signals which further elevate the source rate. Independently digitisation of the European telecommunications networks is taking place based upon a binary hierarchy which stretches from the trunk rate of 140M bit/s to the rate of a single telephone conversation. So if the broadcaster wishes to convey pictures between studios, to radio transmitters or perhaps directly to the home using these links he is faced with the task of converting his source rate to conform to one of the levels in the telecoms multiplex hierarchy. In particular he will wish to use the most economical level which allows him to achieve adequate quality reproduction.

The broadcaster can however identify two distinct levels of reproduction fidelity required from a coding algorithm, these are "contribution" quality for interstudio traffic and "distribution" quality for traffic destined for the home. Each suggests a coding algorithm optimised for different criteria and each a quite different transmission rate. Contribution material should be of studio resolution and of such numerical fidelity that it can withstand post processing, for example by standards conversion, chromakey or multiple passes through the same coding algorithm. We might aim for a transmission rate of 68M bit/s for this. Distribution material (and perhaps news contribution from remote locations) need not be post-processed, but instead conveyed directly to the viewer. Here we can be sure that successive codes will not be encountered and so we are free to exploit the psychovisual redundancy present in the images and aim for a channel rate of 34M bit/s. This rate is emerging as a popular choice for the proposed exchange of pictures within Europe.

SUMMARY OF THE INVENTION

A consequence of having two separate levels of compression is the need to consider transcodability or the ability to convert between levels with the minimum of processing and minimum signal degradation. The very least objective of this conversion should be the avoidance of an intermediate reconstruction and recoding operation. Most previous proposals for 34M bit/s coding, e.g. Westerkamp, D., "Adaptive Infra-/Interframe DPCM Coding for Transmission of Colour TV Signals with 34M bit/s", *Proc. IEEE Int. Zurich Seminar on Digital Comm.*, March, 1984, 39–45, decimate the luminance signal by ¾ or ⅔ prior to encoding. Since it is not generally possible to interpolate coded symbols, conversion to the contribution standard will require decoding and recoding. Interpolation by these ratios is clumsy and may even have to be performed in a future home receiver if the manufacturer has sought to be compatible with other broadcast standards. It is an object of the present invention to overcome the above disadvantages and provide an embedded code procedure with improved transcodability.

It is a further object of the invention to provide a fixed rate embedded code whereby the distribution compression is a subset of the contribution coding.

The present invention provides an encoding algorithm to enable adaptive interpolation of samples of a television signal at a decoder by the generation of a parameter for each interpolated sample site, the parameter being indicative of the best of the available interpolation schemes at that sample site and enabling feature detection.

The present invention further provides an encoding algorithm to enable adaptive interpolation and adaptive prediction of samples of a television signal at a decoder by the generation of a parameter for each interpolated sample site and of a prediction error signal for each predicted sample site, the parameter being indicative of the best of the available interpolation schemes at that sample site, and the predictor to be used at a particular predicted sample site being determined by the values of the parameter for the surrounding interpolated sample sites.

The present invention still further provides an encoder implementing an encoding algorithm to enable adaptive interpolation and adaptive prediction of samples of a television signal at a decoder by the generation of a parameter for each interpolated sample site and of a prediction error signal for each predicted sample site, the parameter being indicative of the best of the available interpolation schemes at that sample site, and the predictor to be used at a particular predicted sample site being determined by the values of the parameter for the surrounding interpolated sample sites.

The present invention yet further provides a decoder for adaptively interpolating and adaptively predicting samples of a television signal, the decoder receiving a parameter for each interpolated sample site and a prediction error for each predicted sample site, the predictor used by the decoder for a particular predicted sample site being determined by the values of the parameter for the surrounding interpolated sample sites, and the interpolation scheme used by the decoder at a particular interpolated sample site being determined by the value of the parameter for that interpolated sample site.

A preferred embodiment of the invention is arranged to operate in a system where, contained within a trunk multiplex is a channel of 68M bit/s capacity, partly carrying the distribution signal and partly additional features such as a secondary luminance error signal, increased chrominance bandwidth or perhaps studio-specific information such as a cromakey keyin signal. To convert between contribution and distribution it is only necessary to demultiplex one 34M bit/s data steam, and to convert to contribution, no effort is required since the distribution code is already compatible. The embedded approach requires only one code at the studio and permits greater flexibility of routing in a network, because rate conversion can be performed under network control at any remote location.

Let us examine the requirements of a coding algorithm to suit the distribution level of a embedded code for 34M bit/s:

To avoid multiple decimation/interpolation by difficult factors we must choose a sampling rate whose sample sites correspond exactly to those at the studio rate, i.e. ratios 1, ½, ¼ ... are allowed. For colour components studio sampling yields a bandwidth well in excess of the eye's requirement and reduction of ½ or ¼ can be tolerated. For luminance however, nothing but full site retention is permissible since reduction by ½ would result in unacceptably "soft" or severely movement-impaired pictures.

Robustness of the coded format to transmission error is important in a signal destined for distribution over many paths. Forward error correction can be applied, but if the errors are correlated, cannot be relied upon to protect an algorithm otherwise prone to chronic disintegration. It has, for example, been popular to adapt the predictor of a predictive coder to better exploit local picture statistics, according to previously received pels, often in the region of edges. While achieving a coding gain under error free conditions, the presence of an error can case a divergence of predictor choice at coder and decoder resulting in catastrophic failure. Even if this is arrested by periodic updating using a fixed intrafield predictor, the viewer would notice a temporary disturbing picture loss. Adapting a predictor according to control data which is transmitted as an overhead prevents total breakdown due to an error and was the approach adopted in Buley, H. and Stenger, L. (1985). "Inter/Intraframe Coding of Colour TV Signals for Transmission at the Third Level of the Digital Hierarchy", *Proc. IEEE*, 73, 4, 765-772. For our distribution algorithm we would require rapid recovery from an error, which also implies rapid settling at the receiver after switch-on when no previously received pels are available.

The coding advantages which may be obtained by exploiting the inadequacies of the human eye to perceive certain types of impairment cannot be ignored in a low-rate distribution compression algorithm.

In a distribution situation, the ratio of decoders to encoders will be high, the former perhaps being paid for by the consumer. The ratio of decoder to encoder complexity should therefore be low.

BRIEF DESCRIPTION OF THE DRAWINGS

Features and advantages of the present invention will become apparent from the following description of preferred embodiments thereof, given by way of example, with reference to the accompanying drawings in which:

FIG. 1 illustrates adaptive interpolation according to a preferred encoding algorithm embodying the invention, in which

DETAILED DESCRIPTION OF THE PREFERRED EMBODIMENT

In a preferred embodiment of the invention the encoding algorithm is applied to television signals to be transmitted in DPCM form. DPCM is well known in the art and is described, for example, in the Westerkamp article mentioned above.

Before describing in detail the preferred encoding algorithm according to the present invention it will first be summarised.

Source luminance samples are split into two groups according to a grid with a 2 frame structure FIG. 1, which separates alternate samples with a line and frame offset. One group is to form an interpolated set, but in order to obtain a higher spatio-temporal resolution than fixed interpolation would permit, a 3-state interplator selection signal is retained at each site. Redundancy is removed from this selection signal and it is conveyed to the receiver. Values of this 3-state selector act as a descriptor at sites surrounding a sample to be predicted (the other group), and control selection of one of a set of 3 dimensional prediction functions, ranging from purely temporal in static areas to contour-adaptive in moving areas. Since the predictor choice is explicitly defined by the descriptors, recovery from channel errors is assured. Prediction error is quantised and coded for transmission.

A third stage in the coding is used to check the quality of the interpolated samples reproduced at the receiver. This is done by locally decoding the transmitted signal at the coder and applying the error signal to a visual model in the manner of an interpolative coding process. The model attempts to locate interpolated samples which have not been reconstructed well enough subjectively, in the context of their surroundings. These are adjusted by the transmission of an error signal which is sufficient to ensure that the model's fidelity criterion is met at the receiver. As with most coders which attempt to exploit subjective criteria, the complexity bias is very much towards the encoder.

THE PREFERRED CODING ALGORITHM

Adaptive Interpolation

Figure 1E:
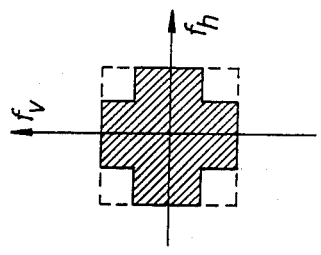
FIG. 1(e) shows the combined bandwidth available using switched horizontal and vertical interpolators.
Figure 1F:
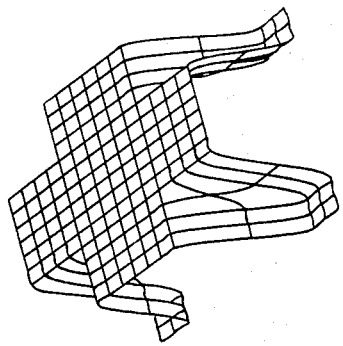
FIG. 1(f) shows the response of a practical cross-shaped prefilter.
Figure 1C:
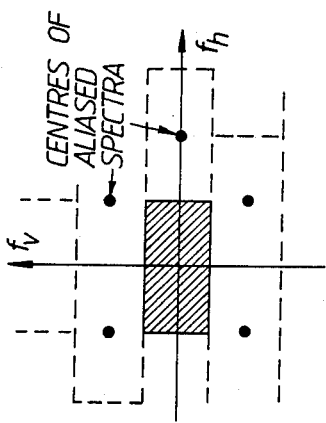
Figure 1D:
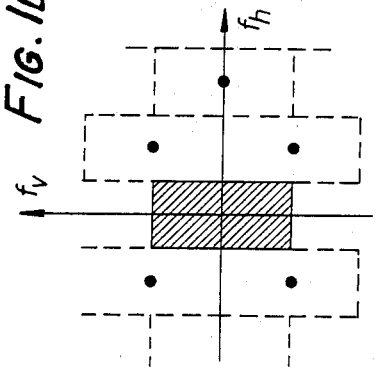
Figure 1A:
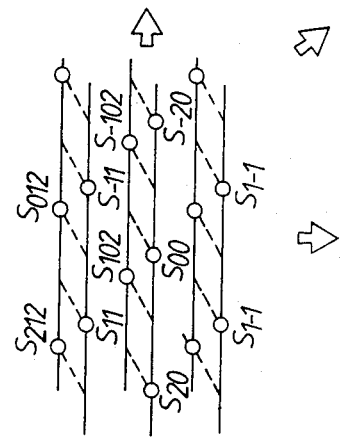
FIG. 1(a) shows the structure of the set of samples to be predicted according to the preferred encoding algorithm, FIGS. 1(b)(c) and (d) show 2-dimensional repeat spectra which limit the bandwidth which can be preserved free of aliassing using ultrafield interpolation to areas which tesellate about the repeat centres shown, the shaded areas represent the maximum bandwidth which can be preserved using a possible fixed interpolate and horizontal and vertical switched interpolators.

FIG. 1(a) shows the structure of the set of samples to be predicted, for convenience neither the interlaced fields nor the true vertical sample spacing is shown. The interpolated set of samples resides between the samples shown. In static areas of the picture, full source resolution can be reconstructed by temporal interpolation.

$$I_{ij}^T = (S_{ij2} + S_{ij-2})/2$$

To ensure that this interpolator will be selected for such areas it is necessary to determine reliably at the source, which samples belong to moving and which to static regions. This segmentation is however, made difficult by two factors, one is that these decisions must be made on a very localised basis (i.e. at every interpolated sample site) and the other is that noise present in the source video results in a wide probability density function of frame-to-frame differences in static areas. For this reason, attempting to segment by thresholding frame differences is an unacceptable solution. A better approach is to average the modulus of many such differences in a locality in order to reduce the variance of the probability density function due to noise. Thresholding then becomes more reliable. In the context of this coding technique two frames are available at the source for movement detection, one before and one after that currently being coded. The method used involves thresholding a motion indicator $\mu$ which is defined over these two frames and a spatial neighbourhood A. For example if the sample to be interpolated is $S_{10}$ then locality $$A = \{20, 10, 00, 11, 1-1\} \text{ and}$$

$$\mu = \frac{1}{15} \sum_{k=-2,0,2} \sum_{ij \in a} |\overline{S_{ij}} - S_{ijk}|$$

$$\text{where } \overline{S_{ij}} = \frac{1}{3} \sum_{k=-2,0,2} S_{ijk}$$

Application of simple temporal interpolation when $\mu$ is greater than some threshold can produce noticeable noise reduction in static areas of noisy source material.

Figure 1B:
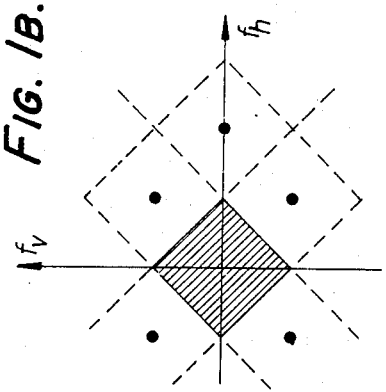

In moving areas this interpolator is not acceptable and intrafield interpolation must be performed. FIG. 1b shows that the 2 dimensional aliased spectra restrict the bandwidth which can be preserved using intrafield interpolation to areas which tessellate about the centres shown. Probably the best that can be obtained is the band shaded in the figure however pictures prefiltered to this extent are unacceptably degraded, so that the difference between static and moving resolution is disturbing. Now consider the bands in (c) and (d) which also tessellate about the alias centres, each preserves half of the source bandwidth but together they can reproduce ¾ of the source spectrum if switching is performed on a local basis. Studies of the 2 dimensional Fourier spectra of typical images and their edge-orientation histograms suggest that the resulting cross shape (e) should preserve the very large majority of spectral components which are also at or near the horizontal and vertical. There is also some evidence that the eye's resolution is similarly anisotropic. The cross itself, of course, does not tessellate about the alias centres, and since it is derived from a non-linear process, would be meaninglessly represented in such a diagram. One point does arise from this however and that is the need for cross-shaped prefiltering. If not applied, spectralcomponents in the corners would alias into the low frequency quadrant and become objectionable causing moire patterning in texture and jagged diagonal edges.

Cross-shaped prefilters can be conveniently designed from prototype horizontal and vertical lowpass filters in the following way:

(i) for prototypes $$H(z_h) = \sum_{n=-N}^{N} h_n z_h^n \quad V(z_v) = \sum_{m=-M}^{M} v_m z_v^m \quad (3)$$

(ii) form seperable 2D lowpass filter $$F(z_h, z_v) = H(z_h) \cdot V(z_v) \quad (4)$$

(iii) "modulate" passband to corners of

2D Nyquist interval $$F(z_h, z_v) = \sum_{n=-N}^{N} \sum_{m=-M}^{M} (-1)^{m+n} h_n v_m z_h^n z_v^m \quad (5)$$

(iv) invert filter so that passband becomes stopband $$F'(z_h, z_v) = 1 - F(z_h, z_v)$$

(v) observe that this has the almost separable structure $$F''(z_h, z_v) = 1 + \sum_{n=-N}^{N} (-1)^n h_n z_h^n \cdot \quad (6)$$

$$\sum_{m=-M}^{M} (-1)^{m+1} v_m z_v^m$$

Figure 2:
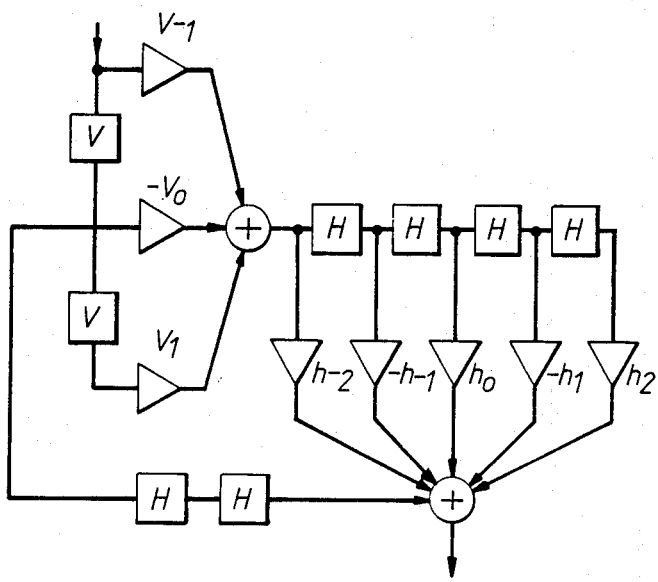
FIG. 2 shows the structure of a simple cross filter suitable for use in the adaptive interpolation of the preferred encoding algorithm for N=2, M=1 ($h_n$, $v_m$)=coefficients of horizontal and vertical prototypes.

The additional "1" can be individually accounted for and the filter has an essentially separable structure, (FIG. 2). This is important, since practical filters must be large, an excessive amount of hardware would be required to build a non-separable structure. For clarity FIG. 2 does not show exploitation of filter symmetry this further simplifies the hardware. So that the filter is only applied in moving areas of the picture it is adapted in the manner mentioned in E. Dubols "The Sampling and Reconstruction of Time-Varying Imagery with Application in Video Systems" (Proc. IEEE, 73, 4, 502-522 1985). The adaption of the cross-filter is arranged so that for a picture or picture area of low movement, where $\mu$ is low and temporal interpolation will apply, no cross-filtering is applied and as movement increases and $\mu$ increased over a threshold, or series of thresholds, cross-filtering is applied to a greater extent, in a non-linear fashion, until for high $\mu$, where spatial switched horizontal and vertical filtering will apply, the cross-filter is fully operational. The simplest form of switched horizontal and vertical interplators is:

$$I_{ij}^H = (S_{i-ij} + S_{i+ij})/2 \quad I_{ij}^V = (S_{ij-1} + S_{ij+1})/2 \quad (7)$$

These have been used by Sabatler, J., et al, 1982 "Coding System for 34M bit/s Digital Transmission of Colour Television:, Commutation & Transmission, 1, 69-82; and by G. Reitmeier and R. Dischert "A Multiplexed Nyquist Region Approach for High Quality 2:1:1 Digital Video", Proc. 13th Int. TV Symp., Montreux, 1983, 400-408, both authors reporting good results although neither used prefiltering (in the latter case reduction of aliasing with additional interpolators is suggested). We have found that higher order classical Newtonian midpoint interpolation outperforms these interpolators but for our purpose interpolators (7) will be used in the following discussions. To determine which interpolator is better in moving areas, we compute the error resulting from application of each, $|S_{ij} - I_{ij}^H|$ and $|S_{ij} - I_{ij}^V|$ and select the lower. To code this information we could simply assign a binary state to each choice, however the same information can be conveyed by signalling whether the better interpolation is higher or lower than $(I_{ij}^H + I_{ij}^V)/2$. Since surrounding samples are available at the receiver (allbeit with some quantisation error) the interpolator D In many low activity picture regions there is no significant difference between one interpolator and another so we are free to choose one which increases the run-length of similar choices. An algorithm has been developed which optimally positions the end of runs amongst these "don't care" choices to minimise some function of interpolation error. This is performed with a single forward and backward pass of each picture line and is real-time implementable.

An algorithm for the optimal positioning of the ends of runs in the 3-state descriptor segmentation Consider the situation where we wish to fit the best of three interpolation functions to samples along a scan line and wish to choose the best functions in regions of arbitrary choice, so that choice run-lengths are maximised and entropy minimised.

(i) At each sample compute some function of the error resulting from application of each interpolator $I^H$, $I^V$, $I^T$ (here for example $f(E) = E^2$)

$$f(E^H) = (S - I^H)^2 \quad f(E^V) = (S - I^V)^2 \quad f(E^T) = (S - I^T)^2$$

(ii) Is one interpolator significantly better than either of the others? i.e. is the difference greater than some threshold T? If "yes" this sample must be replaced by the best interpolation function. If "no" compute the penalty in applying the previous significant choice for each of the functions and accumulate this discrepancy.

algorithm in 2 passes of the line, one forward and one in reverse.

(iv) In general this algorithm can be extended to cover any function f, any number of interpolations and a variable value of T (say determined by the masking function).

Figure 4:
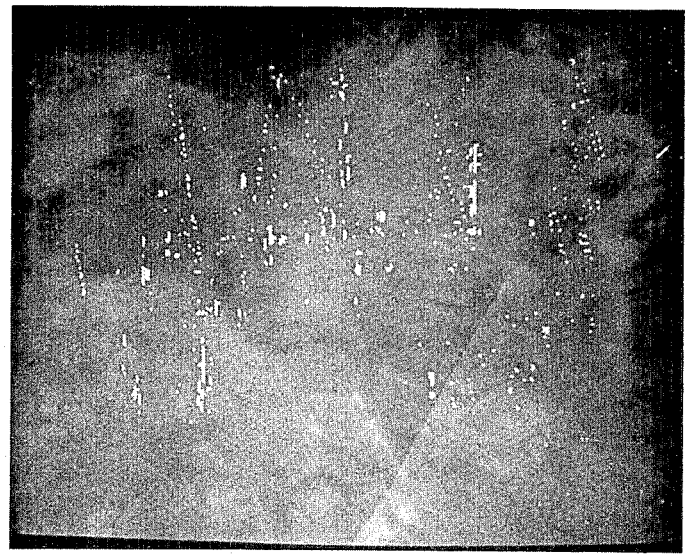
FIG. 4 shows the pattern of the two Laplacian descriptors generated for the boat picture of FIG. 3 according to the preferred encoding algorithm (the temporal interpolation state is suppressed)

The resulting 3-state signal is run-length coded for transmission. An example showing just the 2 Laplacian states in FIG. 4. The value of the conversion from simple direct interpolator switching is now apparent in the ability of the Laplacian zero crossings to convey information about significant picture edges. It is interesting to note the similarly between this and Marr's "primal sketch" model in human vision (Marr and Hildreth "Theory of Edge Detection" Proc. R. Soc. Lond. B, 1980, 207, 187-217). The value of this new interpolator switching signal as a feature detector makes feasible an encoding system where temporal interpolation is dispensed with entirely. Any loss in picture quality is counterbalanced by the savings that would be made by dispensing with frame memories. An example of such an encoding system could use a 2-dimensional intrafield coder with 2-state logical descriptors for 68M bit/s transmission of studio quality TV, or at a higher rate for HDTV transmission.

ADAPTIVE PREDICTION

The 3-state descriptor is transmitted to the decoder in advance of the surrounding predicted samples, this provides a sketch of the locality describing static areas and edges in moving area. This description is now able to control the adaption of the predictive coding process—notice that descriptors are available for the future and the past. Let us examine the causal neighborhood of elements just prior to the coding of $S_{00}$: ($P_{ij}$: previously predicted and reconstructed pels, $D_{ij}$: values of the 3-state descriptor)

$$
\begin{array}{ccccccc}
P_{22} & D_{12} & P_{02} & D_{-12} & P_{-22} & & \\
P_{31} & D_{21} & P_{11} & D_{01} & P_{-11} & D_{-21} & P_{-31} \\
& P_{20} & D_{10} & S_{00} & D_{-10} & & \\
& D_{2-1} & & D_{0-1} & & D_{-2-1} & \\
& & D_{1-2} & & D_{-1-2} & &
\end{array}
$$

Because the descriptors have only 3 states we can express any locality as a logical function in 3-state vari-

|  | example Sample No. | | | | | | | |
|---|---|---|---|---|---|---|---|---|
|  |  | 21 | 22 | 23 | 24 | 25 | 26 | 27 | 28 |
| $f(E^P) - f(E^H)$ | significant | 0 | 0 | 1 | 0 | 0 | 0 | significant |
| $f(E^P) - f(E^V)$ | $I^H$ interpolation | −2 | 1 | 4 | −3 | 2 | 1 | $I^V$ |
| $f(E^P) - f(E^T)$ | i.e. $E^P = E^H$ | −5 | 3 | −4 | 1 | 2 | 0 | interpolation |
| $\Sigma f(E^P) - f(E^H)$ | | 0 | 0 | 0 | 0 | 0 | 0 | |
| $\Sigma f(E^P) - f(E^V)$ | | −2 | −1 | 3 | 0 | 2 | 3 | |
| $\Sigma f(E^P) - f(E^T)$ | | −5 | −2 | −6 | −5 | −3 | −3 | |

Figure 5:
FIG. 5 illustrates adaptive prediction according to the preferred encoding algorithm and shows the points in the boat picture of FIG. 3 where the logical function (9) leads to the selection of a vertically orientated predictor.

(iii) Determine the minimum value of the $\Sigma$'s for each function. In the example, this means that if a significant $I^V$ interpolation is found to follow our run of undefined choices the optimum partition is between samples 22 & 23 and if a significant $I^T$ interpolation follows the optimum partition is between samples. It may be convenient to implement this ables and use this function to select one of a large number of predictors. For example if interpolations surrounding $S_{00}$ are all temporal, then we apply a purely temporal prediction. As an example of spatial prediction consider the logical expression:

$$(D_{12}=D_{01}=D_{10}=D_{0-1}\neq D_{-12}=D_{-21}=D_{-10}=-D_{-2-1})$$

or $$(D_{12}=D_{21}=D_{10}=D_{2-1}\neq D_{-12}=D_{01}=D_{-10}=D_{0-1})$$

which determines a vertical edge and applies at points indicated in FIG. 5. At first sight it may appear that prediction by this process is upset by the striations in Laplacian descriptors due to artificial extensions of run-lengths. This is not so since runs are only extended in low activity regions. The previous sample prediction suggested by a horizontal striation will be as good as (if not better than) any other in these regions. The ruggedness of the technique to channel errors comes from the fact that the predictors are explicitly chosen by a particular logical function and not recursively dependent on previously received predictive samples. Recovery from corruption of either descriptor information or prediction information is guaranteed.

The prediction function applied for a particular logical function is designed by assessing the covariance of the predicted sample location with previous samples in the neighbourhood where the logical function applies, over a set of image sequences. In principle any size of neighbourhood may be used and logical functions can be stored in a ROM or minimised and programmed into a PLA.

Also in principle it is possible to include logical functions of descriptors from other frames, this makes possible motion compensated prediction. Movement-compensated prediction is possible if the descriptor signal can be tracked from frame-to-frame in real-time. The strength of the system to recovery from errors is preserved. This is not the case in recursively adaptive movement-compensation schemes which have been published. The size of ROM necessary to contain the complete set of possible predictors may however be impractical.

It may be seen that the logical "=" in (9), which corresponds to an exclusive-NOR function, is actually performing the same operation as Marr's (see above) AND-gate model of human edge orientation detection (his FIG. 9).

INTERPOLATIVE CODING

Histograms of interpolation error, even due to 2 dimensional interpolation alone, show a remarkably high concentration about zero despite the fact that an open-loop process has been employed so far. Most of the interpolation errors which are present occur where the localised samples are simultaneously changing their slope in two dimensions, because our interpolators cannot respond to second-differences. These will also tend to be regions where visual masking is operating.

Our adaptive interpolator can therefore form a very good basis for an interpolative receiver-model coding strategy (J. Limb "Picture Coding: The Use of a Viewer Model in Source Encoding", BSTJ, 52, 8, 1271-1302, 1973). To realise this we locally decode the transmitted symbols to reconstruct a received picture at the encoder and compute the coding error due to both interpolated and predicted components. This error at the interpolated pels is "viewed" in the context of the background picture itself by a visual model which attempts to detect visible picture impairment. If an offending interpolation is found, a differential term is generated and coded to improve the subjective reproduction of that pel in the receiver. This improved interpolation is also incorporated back into the visual model because its quality has a bearing on the visibility of future interpolation errors.

Figure 6:
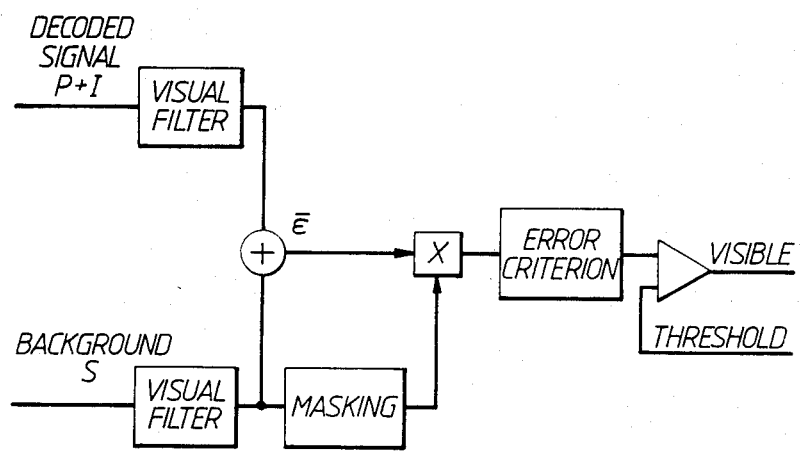
FIG. 6 shows the generalised form of a visual model suitable for use in the interpolative coding according to the preferred encoding algorithm.
Figure 3:
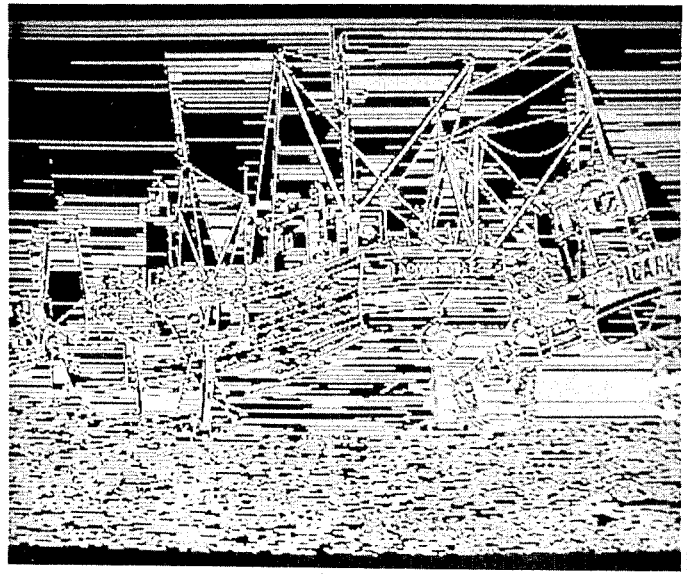
FIG. 3 shows a picture of boats used to illustrate the action of the preferred encoding algorithm.

Visual models for detecting coding impairments generally account for three main aspects of vision: spatio-temporal filtering; luminance intensity thresholds; and masking. FIG. 6 shows such a model, where the visual filter may be considered to contain a non-linearity which accounts for changes in background luminance. A general model may well be unnecessarily complex to characterise the distortions due to a specific coding algorithm however. A first attempt at this was made by Limb (see above) whose visual model was a simple linear lowpass filter, an advantage of the linearity assumption being that the two filters of FIG. 6 can be reduced to one, processing only the coding error.

Limb proposed a "free-running" interpolative coding method, which although not real-time implementable, produced a saving in coding entropy of some 20% over previous-element DPCM for the same subjective quality. He does however report similar performance with his "grid" algorithm, where samples are alternately predictively coded and interpolated in one dimension. This latter approach overcomes some of the implementability problems inherent in the former. Netravali (A. Netravali "Interpolative Picture Coding Using a Subjective Criterion", 1977 IEEE Trans. Comm., 25, 5, 503-508) made significant improvements to the "free-running" approach by using better interpolation, by incorporating masking into the visual model and by adapting the visual filter spread with his masking function. This resulted in a reduction in coding entropy by almost 40% over subjectively identical DPCM with his test images. The justification for adapting the visual filter was that it has been shown that the visibility of errors is lower if the spectral band of the background and errors are close to each other. In other words, in low activity areas high frequency error noise would be more visible suggesting that the filter should have a small spread and conversely for high activity regions. A consequence of the use of a single filter operating on the error is that masking effects must be determined directly from the background and not as in FIG. 6. Netravali's masking function, however, incorporates a weighted spread of signal slopes in a 3×3 neighbourhood which may itself be thought of as an approximation to visual filtering.

Although details of the visual model of the coder in this paper have yet to be determined at the time of writing, it should be noted that the interpolation is 3 dimensional and significantly better than has been used before, a "grid" structure is used which makes for easier implementation of the visual filter and masking effects can be exploited temporally as well as spatially because previous-frame source samples are available. Adapting a (one dimensional) visual filter to encompass large spreads (Netravali's best used 3, 5, 7, 11 elements) does cause some implementational difficulties because of the need to consider the effect of adjusting an interpolated pel dependent on the visibility of future interpolation errors. A true minimum for the number of interpolated elements requiring adjustment can only be found iterative analysis of the whole scan line which is impractical. To illustrate the problem consider a one dimensional filter containing the following 7 error terms:

$$\epsilon(P_{30})\epsilon(I_{20})\epsilon(P_{10})\epsilon(I_{00})\epsilon(P_{-10})\epsilon(I_{-20})\epsilon(P_{-30})$$

If the filter is adapted to have spread 3 (low activity areas) the advantage of a "grid" algorithm is felt and it is only necessary to consider the adjustment of $I_{00}$ in the context of $\epsilon(P_{10})$, $\epsilon(I_{00})$ and $\epsilon(P_{-10})$. In "free-running" algorithms there is no regular structure of predicted pels and it would be necessary to consider adjusting any or all of the terms in the filter. Now assume that our filter is adapted to include the 7 terms above, a decision has been made whether to adjust $I_{20}$ and a decision on $I_{00}$ is required. This will involve some parallel considerations of the potential adjustment of $I_{-20}$ two conditions are fairly clear:

A if interpolative error at $I_{00}$ is acceptable with $I_{-20}$ interpolated: do not adjust $I_{00}$.

B if interpolative error at $I_{00}$ is not acceptable even if $I_{-20}$ were adjusted: adjust $I_{00}$.

The difficulty is how to treat case C:

C the interpolative error at $I_{00}$ is acceptable only if $I_{-20}$ is adjusted.

Since visibility of $\epsilon(I_{-20})$ depends upon $\epsilon(I_{-40})$ it will be necessary to invent some suboptimal decision for case C, the simplest and safest being to choose to adjust $I_{00}$.

Practicality constraints will either limit the visual filter to 7 terms or otherwise simplify the criteria for the adjustment decision. The filter must be one dimensional with respect of $\epsilon(I)$ terms but can easily include $\epsilon(P)$ terms in a 2 dimensional neighbourhood. There is a further exploitation of or 3-state descriptor signal concerning coding of the quantised adjustment error signal. At interpolated points requiring adjustment we have already reconstructed what is most probably the best of the three functions available, the inferior interpolations however are very likely to act as a pointer showing in which direction the adjustment applies. Because this considerably influences the probability distribution of quantiser states it can be used in the assignment of entropy codes to these states.

SUMMARY: CODING ALGORITHM

A coding algorithn has been described for the transmission of distribution quality broadcast television at 34M bit/s which can form the basis of an embedded code for providing a numerically higher fidelity at 68M bit/s. The technique is a hybrid of interpolative and predictive coding both of which are explicitly controlled by a 3-state descriptor signal, transmitted in place of alternate source samples. This ensures a rapid recovery from the effects of channel errors. The channel capacity expended on this descriptor is justified by exploiting it in three was, first it defines adaptive interpolation of the omitted samples, second it controls inter-/intraframe-contour adaptive prediction and third it is used to control assignment of entropy codes to quantised errors which are used to adjust subjectively inadequate interpolated pels. An important aspect of the algorithm is that when channel capacity is insufficient to convey the highest quality reproduction, a model of the human visual system is used to partition available capacity for minimum subjective distortion.

Any form of coding may be applied to the descriptor, predictive error, or interpolative error.

An efficient form of transmitting the interpolation error is to interleave it with the prediction error. A spare state in the quantiser can be assigned to the signalling of this.

Provision is made for the occasional transmission of PCM words to eradicate "frozen" errors is static areas.

Chrominance coding is performed by a decimation operation to a reduced density sample pattern and coded using either pure predictive and interpolative coding using the luminance descriptors to control the process.

The addition of any form of enhancing data to make the system achieve a rate of 68M bit/s or any other higher rate is allowed for. This is fundamental to the embedded structure for which this code is designed.

THE PREFERRED ENCODER

Figure 7:
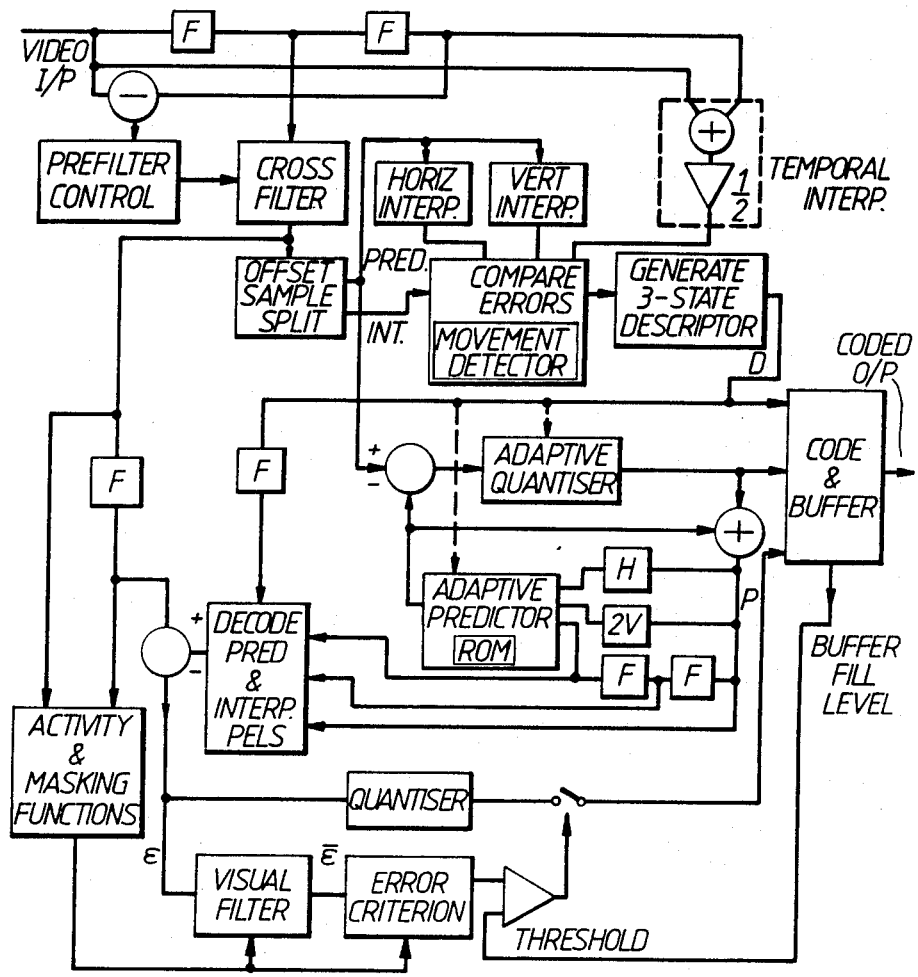
FIG. 7 shows a block diagram of a luminance encoder suitable for implementing the preferred encoding algorithm.

A diagram of the luminance coder implementing the preferred encoding algorithm is shown in FIG. 7 (F denotes a frame delay). The decoder however is simpler than most adaptive DPCM decoders because of the explicit nature of the control function—this is important for distribution applications. Implementation is also eased because the predictive loop and frame delays are only operating on half of the input samples.

This latter feature makes the encoding system according to the present invention particularly attractive as a method of encoding high definition television signals.

In the preferred encoder the fill level of the output buffer is used to partly control the crossfilter adaption. This ensures that when a picture contains only small amounts of movement, full resolution can be retained in these areas. Emergency control to prevent rate-buffer overflow is also provided by changing the adaptive quantiser at coder and decoder to have a coarser structure. This too is controlled by the rate buffer fill-level.

THE DECODER

Figure 8:
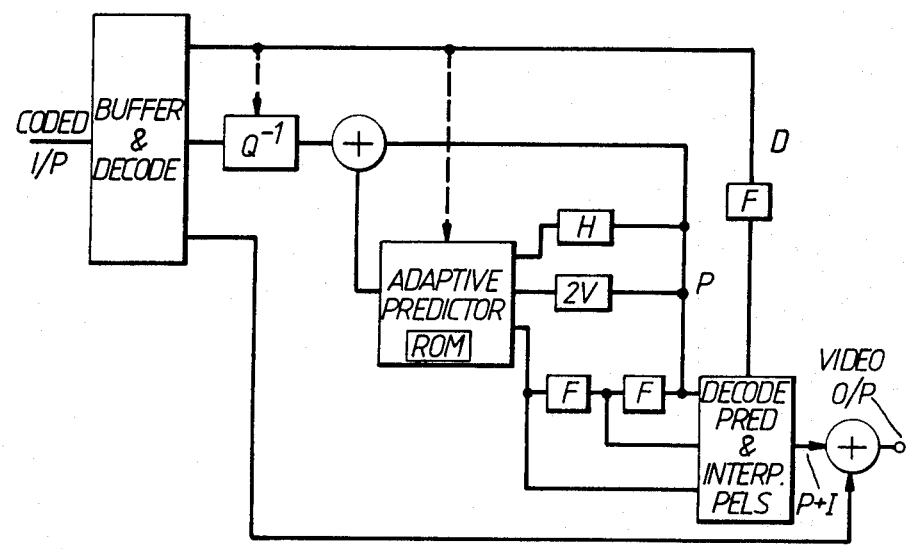
FIG. 8 shows a block diagram of a luminance decoder suitable for decoding signals encoded according to the preferred encoding algorithm.

A diagram of a luminance decoder suitable for use with the preferred encoding algorithm is shown in FIG. 8.

Although described for a particular transmission rate and sampling structure this encoding algorithm can be used with any which permits use of switched interpolation. Any interpolation function may be used, in fact classical Newtonian midpoint interpolation has been shown to improve performance over a simple two-term average. These are of the general form:

$$\nabla^n S_{\frac{1}{2}} = 0$$

For linear interpolation this yields (n=2):

$$I_i = (S_{i-1} + S_{i+1})/2 \text{ (as described)}$$

And for higher orders (eg. n=4)

$$I_i = (-S_{i-3} + 9S_{i+1} + 9S_{i-1} - S_{i+3})$$

This system permits retention of all source sampling sites (no decimation) and therefore allows a distribution quality signal to be embedded in a contribution quality signal at a higher rate and with higher numerical fidelity.

The above described system has a number of features listed below. It is considered that each of the features is novel and all combinations and subcombinations are also novel in relation to the transmission and/or reception of digital signals representing television pictures:

(a) The combination of a non-stationary line quincunx subsampling structure with the switched interpolation and filtering;
(b) The use of this cross-shaped filtering with switched interpolation;
(c) The transformation which permits use of any interpolator switching signal as a feature detector (here Laplacian edge detector);
(d) The use of this edge detection signal, transmitted as an overhead, to control a prediction in a robust way;
(e) The use of a read-only-memory to implement this prediction adaption (this structure alone has significant advantages in the implementation o this and similar algorithms for coding HDTV signals where coding speed is vital); (f) The use of a visual model in this interpolative coding technique and its control by the rate buffer fill-level;
(g) The algorithm for optimal positioning of the 3-state descriptor segmentation;
(h) The algorithm is able to detect still picture areas using the motion detector described. In such regions the temporal interpolation results in noise reduction;
(i) The descriptors can be used to recognise predictable picture areas by a simple logical function, this can be used to adapt between different entropy code word allocation in a robust way.

The entropy code allocation in (i) should not be confused with entropy code allocation in the interpolative coding part of the algorithm, which is based upon interpolation values obtained from the three possible interpolators at the receiver. This is described in the text.

I claim:

1. Apparatus for encoding a television signal to be transmitted, comprising:
   means for sampling a television signal to be encoded;
   means for selecting sites of samples to be interpolated by one of a plurality of interpolation schemes;
   means for processing samples neighbouring each sample to be interpolated to evaluate which interpolation scheme applied to the neighbouring samples produces the best value for that interpolated sample;
   means for generating a descriptor signal adapted, for each sample to be spatially interpolated, to generate a descriptor signal indicative of whether the best spatial interpolation scheme for that sample produces a value greater or less than the average of the values produced by the plurality of spatial interpolation schemes; and
   means for transmitting the descriptor signals.

2. Apparatus according to claim 1 wherein the plurality of interpolation schemes comprises a horizontal and a vertical interpolation scheme.

3. Apparatus according to claim 2, and further comprising a cross-shaped prefilter.

4. Apparatus according to claim 3, wherein the means for selecting sites for samples to be interpolated is adapted to select every other sample with a line and frame offset (HEX4).

5. Apparatus according to claim 2, wherein the plurality of interpolation schemes further comprises a temporal interpolation scheme, and the means for generating a descriptor signal is adapted, for each signal to be temporally interpolated, to generate a descriptor signal indicative of temporal interpolation.

6. Apparatus according to claim 5, wherein there is provided a movement detector to evaluate the movement in the television image in an area around each sample to be interpolated and to compare the evaluated movement with a threshold value, the processing means being adapted to determine that temporal interpolation is best when the movement evaluated by the movement detector is less than the threshold value.

7. Apparatus according to claim 6, wherein the movement detector evaluates a movement indicator $\mu$ for an area A around each sample to be interpolated and compares the value of $\mu$ with a threshold value, where $$\mu = \frac{1}{15} \sum_{k=-2,0,2} \sum_{i,j \in a} |\overline{S_{ij}} - S_{ijk}|$$

$$\overline{S_{ij}} = \frac{1}{3} \sum_{k=-2,0,2} S_{ijk}$$

8. Apparatus according to claim 7, and further comprising a cross-shaped prefilter and a prefilter control, wherein the movement detector is adapted to compare the evaluated movement with a plurality of threshold values, the prefilter control is adapted to inhibit the action of the prefilter when the movement evaluated by the movement detector is below a first threshold value and to relax the inhibition of the prefilter in a non-linear fashion as the movement evaluated by the movement detector increases.

9. Apparatus according to claim 1, and further comprising means for run-length coding the descriptor signals prior to transmission, the run-length coding means comprising means for evaluating the optimum position of the ends of runs by assessing whether or not a particular one of the plurality of interpolation schemes is significantly better at a particular sample site to be evaluated than the other interpolation schemes.

10. Apparatus according to claim 1, wherein the selection means is adapted to further select sites of samples to be predicted by one of a plurality of prediction schemes, the sites of the samples to be predicted alternating with the sites of the samples to be interpolated; and there are further provided an adaptive predictor to determine the prediction scheme applied for each sample to be predicted, the adaptive predictor being arranged to select a prediction scheme dependent on the descriptor signals for the samples to be interpolated neighbouring that sample to be predicted, means for evaluating the prediction error at each sample to be predicted and means for transmitting signals indicative of the prediction errors.

11. Apparatus according to claim 10, wherein the adaptive predictor comprises a ROM storing the plurality of prediction schemes, the ROM being arranged to output one of the plurality of prediction schemes in response to input descriptor signals.

12. Apparatus according to claim 10, and further comprising means for reconstructing the television signal from the descriptor signals and the prediction error signals, means for comparing the reconstructed television signal with the original television signal using a visual model to detect errors in interpolated samples; means for evaluating the size of the detected errors by comparison with a threshold value and for generating an error correction signal for each detected error greater than the threshold value, and means for transmitting the error correction signals.

13. Apparatus according to claim 12 and further comprising a buffer for storing signals prior to transmission, wherein the means for evaluating the size of detected errors is adapted to use a higher threshold level when the buffer fill level is high.

14. A method of encoding a television signal to be transmitted comprising the steps of:
sampling a television signal to be encoded;
selecting sites to be interpolated by one of a plurality of interpolation schemes;
for each sample to be interpolated, processing samples neighbouring the sample to be interpolated to evaluate which spatial interpolation scheme applied to the neighbouring samples produces the best value for that interpolated sample;
for each sample to be interpolated, generating a descriptor signal indicative of whether the best spatial interpolation scheme for that interpolated sample produces a value higher or lower than the average of the values produced by the plurality of spatial interpolation schemes; and
transmitting the descriptor signals.

15. A method according to claim 14, and comprising the steps of evaluating, for each sample to be interpolated, the amount of movement in an area of the television picture surrounding that sample, generating a descriptor signal indicative of temporal interpolation when the evaluated movement is less than a threshold amount, and transmitting the descriptor signal indicative of temporal interpolation in preference to another descriptor signal generated for that sample to be interpolated.

16. Apparatus for decoding an encoded television signal, comprising:
input means for receiving as an input an encoded television signal, the encoded television signal comprising a plurality of descriptor signals, each descriptor signal relating to a sample of the decoded television signal and being indicative of one of a plurality of interpolation schemes to apply to samples neighboring said sample to substantially reconstruct said sample;
extraction means connected to the input means for deriving said descriptor signals from the encoded television signal;
interpolation means connected to the extraction means for reconstructing each said sample of the decoded television schemes indicated by the relevant descriptor signal to signals representing the reconstructed neighboring samples; and
output means connected to the interpolation means for outputting the reconstructed samples.

17. Apparatus according to claim 16, wherein at least some of said plurality of descriptor signals are indicative of ones of a plurality of spatial interpolation schemes, said at least some descriptor signals each indicating that the value for the respective sample when reconstructed using the respective spatial interpolation scheme is one of higher and lower than the average of the values produced by the plurality of spatial interpolation schemes; and
the interpolation means is adapted to evaluate, for each of the samples to which said at least some descriptor signals relate, the average value produced by said plurality of spatial interpolation schemes and to reconstruct each of said samples using the spatial interpolation scheme which produces a value relative to said average consistent with the relevant descriptor signal.

18. Apparatus according to claim 17, wherein the plurality of spatial interpolation schemes comprises a horizontal and a vertical interpolation scheme.

19. Apparatus according to claim 18, wherein the plurality of interpolation schemes further comprises a temporal interpolation scheme.

20. Apparatus according to claims 16, 17 or 18 wherein the encoded television signal comprises the descriptor signals in the run-length coded form.

21. Apparatus according to claim 16, wherein the encoded television signal further comprises prediction error signals, each prediction error signal relating to a sample of the decoded television signal, the samples to which the prediction error signals relate alternating in the decoded television signal with the samples to which the descriptor signals relate:
the extraction means is adapted to derive said prediction error signals from the encoded television signal; and further comprising:
an adaptive predictor connected to the extraction means for reconstructing each sample to which the prediction error signals relate by applying one of a plurality of prediction schemes to the relevant reconstructed neighboring samples and adjusting the result by an amount determined by the value of the relevant prediction signal;
the adaptive predictor is adapted to reconstruct each sample using a prediction scheme determined by the values of the descriptor signals relating to the neighboring samples;
the interpolation means is adapted to apply interpolation schemes to signals representing samples reconstructed by the interpolation means itself; and
the output means is adapted to output samples reconstructed by the interpolation means and the adaptive predictor.

22. Apparatus according to claim 17, wherein the encoded television signal further comprises prediction error signals, each prediction error signal relating to a sample of the decoded television signal, the samples to which the prediction error signals relate alternating in the decoded television signal with the samples to which the descriptor signals relate;
the extraction means is adapted to derive said prediction error signals from the encoded television signal; and further comprising:
an adaptive predictor connected to the extraction means for reconstructing each sample to which the prediction error signals relate by applying one of a plurality of prediction schemes to the relevant reconstructed neighboring samples and adjusting the result by an amount determined by the value of the relevant prediction signal;
the adaptive predictor is adapted to reconstruct each sample using a prediction scheme determined by the values of the descriptor signals relating to the neighboring samples;
the interpolation means is adapted to apply interpolation schemes to signals representing samples reconstructed by the interpolation means itself; and
the output means is adapted to output samples reconstructed by the interpolation means and the adaptive predictor.

23. Apparatus according to claim 18, wherein the encoded television signal further comprises prediction error signals, each prediction error signal relating to a sample of the decoded television signal, the samples to which the prediction error signals relate alternating in the decoded television signal with the samples to which the descriptor signals relate;

the extraction means is adapted to derive said prediction error signals from the encoded television signal; and further comprising:

an adaptive predictor connected to the extraction means for reconstructing each sample to which the prediction error signals relate by applying one of a plurality of prediction schemes to the relevant reconstructed neighboring samples and adjusting the result by an amount determined by the value of the relevant prediction signal;

the adaptive predictor is adapted to reconstruct each sample using a prediction scheme determined by the values of the decriptor signals relating to the neighboring samples;

the interpolation means is adapted to apply interpolation schemes to signals representing sammples reconstructed by the interpolation means itself; and the output means is adapted to output samples reconstructed by the interpolation means and the adaptive predictor.

24. Apparatus according to claim 19, wherein the encoded television signal further comprises prediction error signals, each prediction error signal relating to a sample of the decoded television signal, the samples to which the prediction error signals relate alternating in the decoded television signal with the samples to which the descriptor signals relate;

the extraction means is adapted to derive said prediction error signals from the encoded television signal; and further comprising:

an adaptive predictor connected to the extraction means for reconstructing each sample to which the prediction error signals relate by applying one of a plurality of prediction schemes to the relevant reconstructed neighboring samples and adjusting the result by an amount determined by the value of the relevant prediction signal;

the adaptive predictor is adaptd to reconstruct each sample using a prediction scheme determined by the values of the descriptor signals relating to the neighboring samples;

the interpolation means is adapted to apply interpolation schemes to signals representing samples reconstructed by the interpolation means itself; and the output means is adapted to output samples reconstructed by the interpolation means and the adaptive predictor.

25. Apparatus according to claim 20, wherein the encoded television signal further comprises prediction error signals, each prediction error signal relating to a sample of the decoded television signal, the samples to which the prediction error signals relate alternating in the decoded television signal with the samples to which the descriptor signals relate;

the extraction means is adapted to derive said prediction error signals from the encoded television signal; and further comprising:

an adaptive predictor connected to the extraction means for reconstructing each sample to which the prediction error signals relate by applying one of a plurality of prediction schemes to the relevant reconstructed neighboring samples and adjusting the result by an amount determined by the value of the relevant prediction signal;

the adaptive predictor is adapted to reconstruct each sample using a prediction scheme determined by the values of the descriptor signals relating to the neighboring samples;

the interpolation means is adapted to apply interpolation schemes to signals representing samples reconstructed by the interpolation means itself; and the output means is adapted to output samples reconstructed by the interpolation means and the adaptive predictor.

26. Apparatus according to claims 21, 22, 23, or 24, wherein the adaptive predictor comprises a ROM storing the plurality of prediction schemes, the ROM being arranged to output one of the plurality of prediction schemes in response to input descriptor signals.

27. Apparatus according to claims 21, 22, 23, or 24, wherein the encoded television signal further comprises error correction signals, each error correction signal relating to a sample of the decoded television signal; and addition means, connected between the output of the interpolation means and the output means, for adjusting the value of the reconstructed samples to which the error correction signals relate by an amount dependent on the value of the relevant error correction signal.

28. Apparatus according to claim 25, wherein the adaptive predictor comprises a ROM storing the plurality of prediction schemes, the ROM being arranged to output one of the plurality of prediction schemes in response to input descriptor signals.

29. Apparatus according to claim 25, wherein the encoded television signal further comprises error correction signals, each error correction signal relating to a sample of the decoded television signal; and addition means, connected between the output of the interpolation means and the output means, for adjusting the value of the reconstructed samples to which the error correction signals relate by an amount dependent on the value of the relevant error correction signal.

* * * * *